April 7, 1959  F. M. DEMER ET AL  2,881,364
ELECTRICAL ASSEMBLY HOUSING
Filed Nov. 12, 1954  3 Sheets-Sheet 1

INVENTORS
FREDERICK M. DEMER
BEAL MARKS
BY
Dewey J. Cunningham
ATTORNEY

April 7, 1959  F. M. DEMER ET AL  2,881,364
ELECTRICAL ASSEMBLY HOUSING
Filed Nov. 12, 1954  3 Sheets-Sheet 2
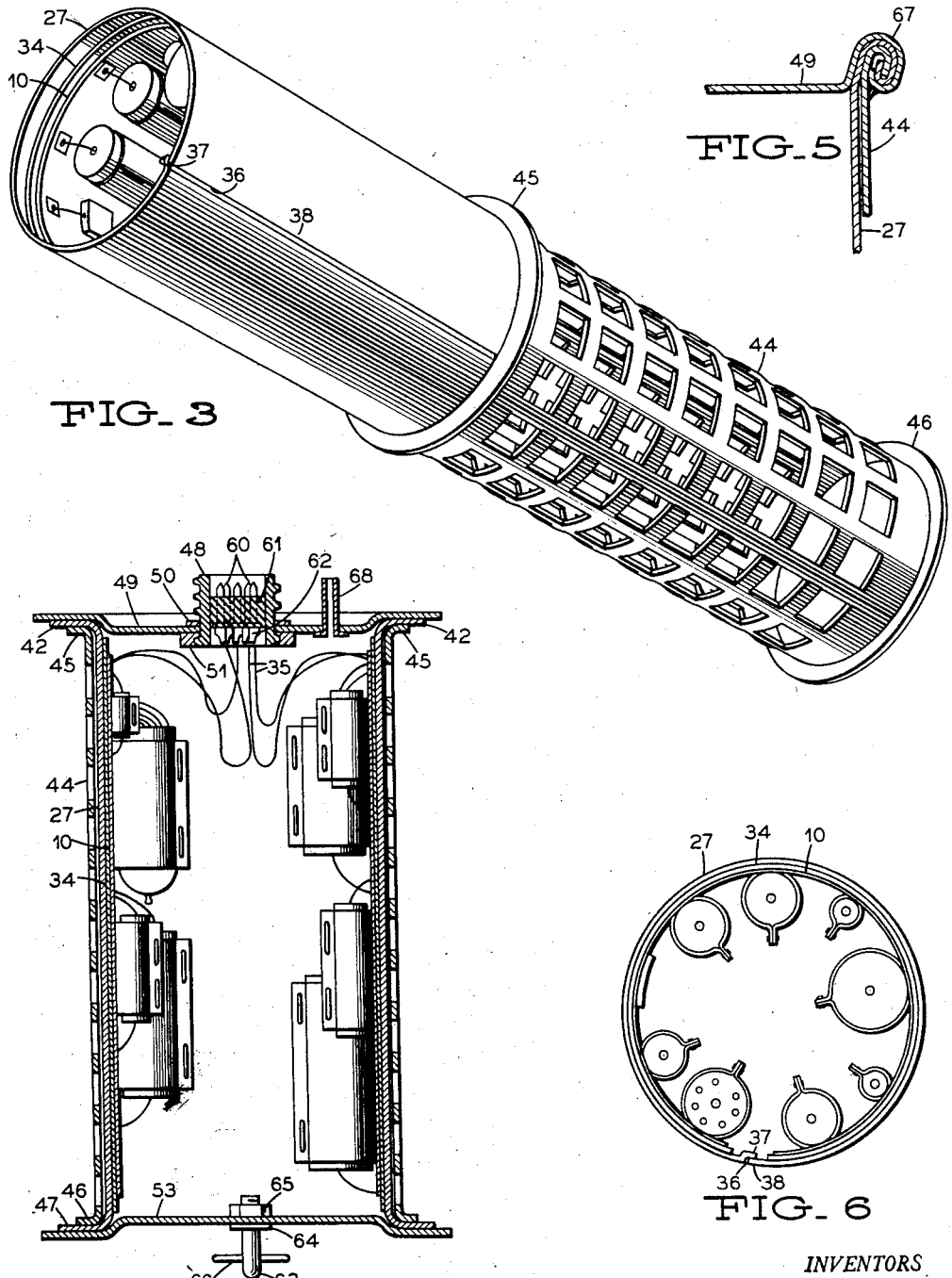
INVENTORS
FREDERICK M. DEMER
BEAL MARKS
BY
Dewey J. Cunningham
ATTORNEY

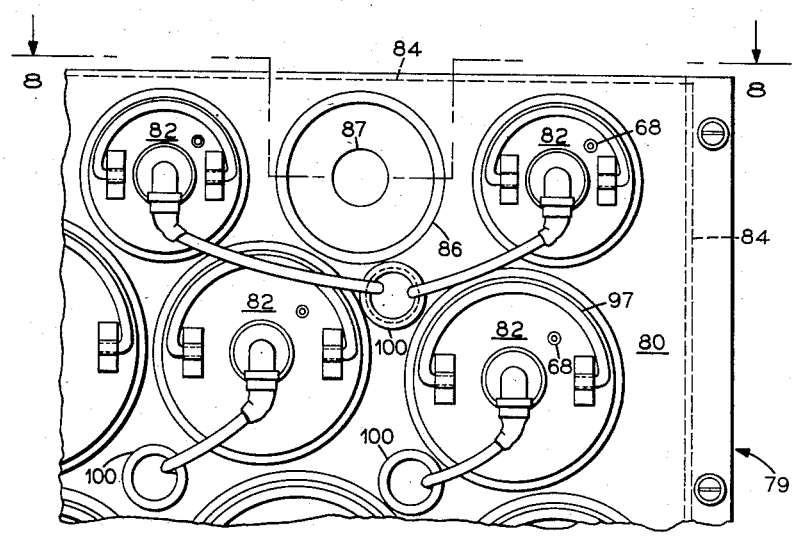
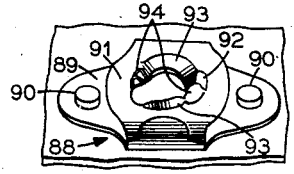
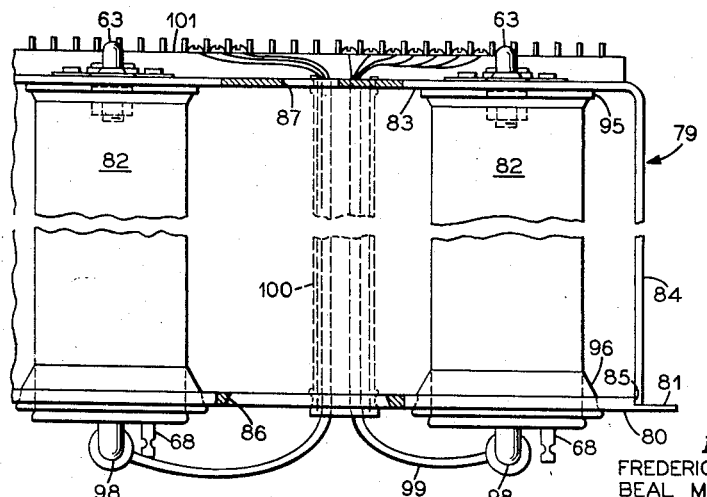

United States Patent Office 2,881,364
Patented Apr. 7, 1959

2,881,364

ELECTRICAL ASSEMBLY HOUSING

Frederick M. Demer, Johnson City, and Beal Marks, Owego, N.Y., assignors to International Business Machines Corporation, New York, N.Y., a corporation of New York Application November 12, 1954, Serial No. 468,254

2 Claims. (Cl. 317—100)

The present invention relates to an apparatus for housing electronic assemblies for use in airborne equipment.

The increased capabilities of modern aircraft in terms of higher speed and altitude make reliable operation of electronic assemblies more difficult to achieve. Extremes of pressure and temperature and the rate of change of these quantities in the compartments of such high performance aircraft require that some specially constructed apparatus be provided for housing the assemblies. In providing such an apparatus, the assemblies are housed in an environment which is suitable for reliable operation. The environment is taken aloft with the aircraft and the assembly is maintained under conditions which are as favorable as the conditions under which it operates when not airborne.

In providing a housing and environment as described above, special consideration must be given to volume and weight. Weight becomes particularly important since high performance aircraft pay a much higher penalty in terms of range and performance than more coventional aircraft. Since the components of the electronic assembly generate considerable heat, it will be appreciated that the housing for the assembly must be cooled by some external means. Therefore, the construction for the housing must be such that it can be efficiently cooled without placing too great a strain on the aircraft power plant by the external cooling means.

In view of the above-described considerations, an object of the present invention is to furnish improved apparatus for housing electronic assemblies which are adapted to be used in airborne equipment in a manner to afford reliable operation and protection of the assemblies from the extremes of pressure and temperature encountered while in flight.

Another object of this invention is to provide improved apparatus for housing airborne electrical assemblies wherein a direct and efficient transfer of heat, generated by the components of the assemblies, to the atmosphere is made with a minimum burden on the aircraft in terms of power consumed by the heat transfer process.

Still another object of the invention is to furnish an electronic assembly housing, of the type disclosed, which is small in size and light in weight for the size of the assembly housed.

A further object of the present invention is to provide an electronic assembly housing which affords ease in associating the components of the assembly therewith, a low rejection rate of completed assemblies, and semi-automatic production.

A still further object of the invention is to provide improved apparatus for mounting and housing an electronic assembly which may be constructed without injury to the assembly components during the construction operation.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 3 is an exploded isometric view of the component can and the cage therefor;

Fig. 4 is a sectional view of the component can mounted in its cage before final assembly;

Fig. 5 is a sectional detail of the seal between the top of the component can, the can wall, and the cage wall;

Fig. 6 is a view looking into the top of the can assembly shown in Fig. 3;

Fig. 7 is a plan view of a portion of the rack used for mounting a plurality of assemblies;

Fig. 8 is a section taken on lines 7—7 of Fig. 7; and

Fig. 9 is an isometric view of a fastener.

Figure 1:
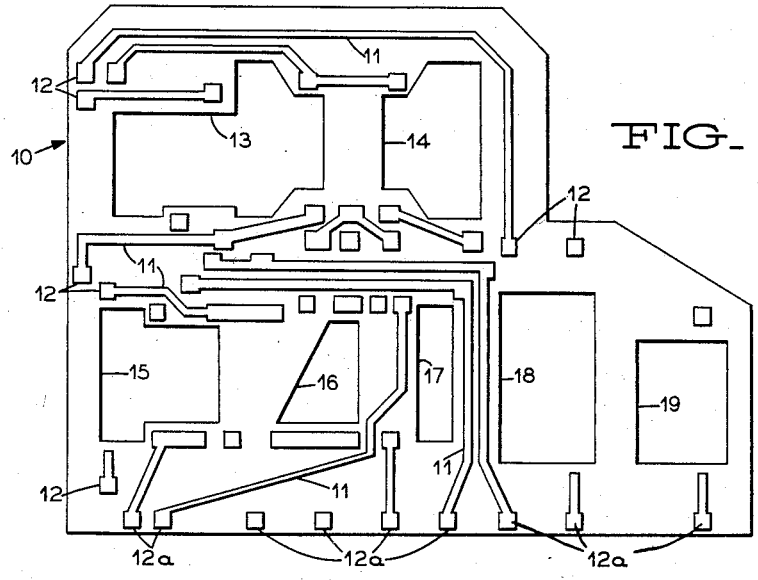
Fig. 1 is a plan view of the circuit board.

Referring to Fig. 1, a printed circuit component board is shown and is designated by reference numeral 10. This circuit board is constructed from a flexible material such as thin silicone rubber or glass cloth and is suitably treated to permit rolling to a relatively small diameter without cracking. The material selected is used as a base material and then clad with copper. The proper printed circuit, determined by the particular circuit being assembled, is then produced by any of the well-known techniques. As shown, a number of conducting paths are produced, only a few of which are furnished with the reference numeral 11 for purposes of illustration. Each path has the usual terminals 12 which facilitate electrical mounting of the individual components. The input and output terminals for the assembly are illustrated by reference numeral 12a and are shown in a row along one edge of the circuit board. While nine such terminals are shown it will be understood that the number will vary with the particular circuit being assembled. A plurality of apertures of various shapes are cut in the printed circuit board and are illustrated by reference numerals 13, 14, 15, 16, 17, 18 and 19.

Figure 2:
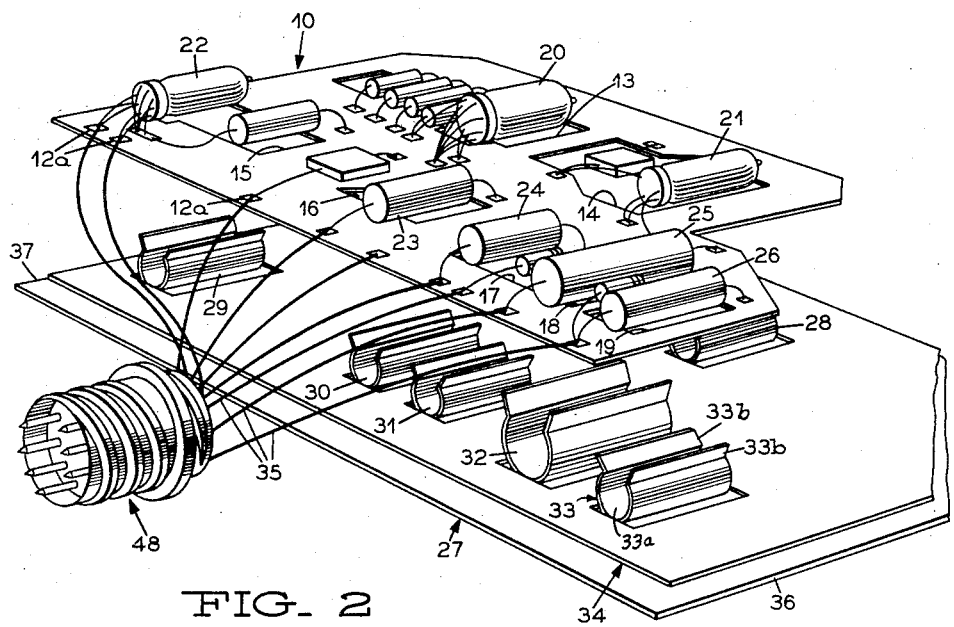
Fig. 2 is an exploded isometric view showing the manner of mounting the electrical components.

Referring now to Fig. 2, a number of electrical components are electrically connected to various points on the printed circuit. The points of connection are determined by the particular circuit which is being packaged. By way of example, vacuum tubes 20, 21 and 22, which may be of the miniature or sub-miniature type, are adapted to be electrically connected to the terminals adjacent apertures 13, 14 and 15, respectively. Resistors 23 and 24 are electrically connected to terminals adjacent apertures 16 and 17, respectively, while capacitors 25 and 26 are electrically connected to terminals adjacent apertures 18 and 19, respectively. It will be noted that the various electrical devices lie across the apertures in the printed circuit board. A number of smaller components such as resistors or capacitors are shown mounted on the printed circuit board. The electrical connection of these components also serve as the mechanical connection therefor.

The component mounting plate, illustrated generally by reference numeral 27, is constructed from a relatively thin metal having a high heat transmission coefficient. For example, sheet copper approximately .005″ to .008″ thick may be utilized. The component mounting plate serves to mechanically mount all of the heat dissipative components above some arbitrary dissipative level. The plate also mounts large capacitors which might not stay put if merely supported by their terminals. A plurality of component mounting clips 28, 29, 30, 31, 32 and 33 are soldered to the component mounting plate and are adapted to mechanically hold components 21, 22, 23, 24, 25 and 26, respectively. A clip is provided for holding tube 20 although it is not shown in the drawings.

The afore-mentioned clips may be constructed in a number of different configurations. They have the dual purpose of mechanically holding the heat dissipative components and transferring the heat from the components to the component mounting plate in the most direct manner. In order to perform these functions the components must be held firmly, i.e., by a pressure fit, and in intimate surface contact with the clips. This affords maximum heat transmission. A number of materials may be used for the clips, i.e., silver, copper, etc. The material should be thin enough to readily conform to the outline of the component and yet strong enough to mechanically hold the components under vibration or shock conditions.

Since all the clips are generally alike, only clip 33 will be explained in detail. This clip includes an open loop 33a which is adapted to receive and conform to the outline of the component. The mid-portion of the loop is soldered or otherwise secured to the component mounting plate. At the free ends of the loop, flanges 33b are provided. When the components are placed in the open loops, the flanges are brought together and connected by appropriate means, i.e., stapling, soldering or the like. It will be apparent that other types of clips may be used in lieu of those shown, it being important, however, to get maximum heat transmission from the components directly to the component mounting plate. By way of example, the component mounting clip such as that described in copending application, Serial No. 411,657, entitled "Cooling Apparatus," by Robert E. Slack. A liner 34, which is constructed of a suitable insulating material such as silicone rubber, is provided between the printed circuit board 10 and the component mounting plate 27. Liner 34 is apertured to receive the mounting clips and prevent electrical contact between the printed circuits on board 10 and plate 27. It will be understood that in making connections between the component leads and the printed circuit terminals, the terminals may be perforated to permit entry of the lead for subsequent soldering. It is the portion of the lead which extends through the printed circuit board which must be insulated from plate 27.

As previously explained, a plurality of input and output terminals 12a are provided along one edge of the printed circuit board. A plurality of leads 35 are connected to these terminals and to a multiple terminal plug indicated generally by the reference numeral 48. At this time the entire circuit may be tested electrically by connection directly to plug 48.

Reference is now additionally made to the remaining figures. The component mounting plate 27, the printed circuit board 10 and the liner therebetween, are initially rolled into a cylinder as shown in Fig. 3. Edge 36 of the component mounting plate is lapped over edge 37 of said plate and secured as by soldering, welding or the like, thereby forming a seam 38. From Fig. 6, it will be seen that the components are all arranged adjacent the inner periphery of the cylinder afore-mentioned. This cylinder is adapted to be inserted in a perforated cylinder 44 having flanges 45 and 46 at the ends thereof. Cylinder 44 may be constructed from a number of different materials, depending on the strength thereof. For example, sheet steel may be utilized. The cylinder is of sufficient rigidity to support the relatively thin material used in the component mounting plate, serving as a sort of cage therefor. As shown in Fig. 4, the component cylinder fits in cylinder 44 in complementary fashion. Flanges 42 and 47 are then formed on opposite ends of the component cylinder in a position to overlie flanges 45 and 46, respectively.

At this time the terminal plug 48, which is of the conventional hermetic sealed type, is adapted to be secured to the top 49 which is apertured to receive that portion of the plug below shoulder 50, said shoulder being arranged to overlie the portion of top 49 adjacent the aperture. A nut 51 is received by the lower portion of the plug so as to secure said plug to the top. A solder seal may be provided where the shoulder engages top 49, if desired. As shown, plug 48 includes a plurality of male connectors 60 which are embedded in an insulating compound illustrated at 61. The insulating compound serves to preserve the integrity of the hermetic seal within the container. These connectors are provided with the usual solder pots 62 to which the ends of leads 35 are adapted to be secured.

The bottom 53 is apertured centrally thereof to receive the threaded portion of a stud 63, said stud having a shoulder 64 which is adapted to engage the peripheral edges of the aperture. A nut 65 is adapted to be received by said threaded portion in order to secure the stud to the bottom. Adjacent one end of the stud, a pin 66 extends transversely therethrough. The purpose of the stud and pin arrangement is to secure the completed assembly in a cooling rack. This will be more apparent as the description proceeds.

With the top and bottom members in position, as shown in Fig. 4, the entire assembly may now be placed in a conventional can sealing apparatus and sealed. Fig. 5 is a sectional view of the seam which is provided by the can sealing apparatus. The seam is illustrated by reference numeral 67 and is shown enlarged to illustrate the manner in which the flanges on the component mounting plate cylinder, the flanges on the perforated cylinder and the peripheral edges of the top and bottom are combined to form the seam. It will be apparent that the finished seam bears a resemblance to the conventional seam found on cans which contain food and the like. One variation which is brought about is due to the fact that an additional flange, i.e., the flange on the component mounting plate cylinder, is incorporated in the seam. It will be noted that flange 45 is formed into a U-shaped member during the sealing operation. By making flange 42 sufficiently wide so that it will curl around with the periphery of the top, it fits within said U-shaped member. The arrangement shown has been found to give satisfactory sealing without soldering. However, to assure a perfect seal, solder is applied as shown in Fig. 5.

The assembly described above will hereinafter be referred to as a module for purposes of description. The top 49 is provided with a pinch-off tube 68 which is utilized in the hermetic sealing operation which will now be briefly described. The module is placed in a vacuum chamber which is then evacuated. The moisture content of the air inside the chamber is reduced so that the air inside the module is sufficiently dry. After this condition is reached, an inert gas such as helium is allowed to flow into the chamber. At the same time, the pressure inside the chamber is allowed to rise. After atmospheric pressure is reached a sufficient amount of helium has flowed into the module. The pressure inside the chamber is then raised approximately two pounds per square inch above atmospheric pressure and tube 68 is pinched off to seal the module. Suitable mechanical devices may be provided inside the chamber for performing this operation. The helium inside the chamber may then be removed and the module is ready for use.

The description to this point has dealt with the mounting of individual heat dissipating components in a housing in a manner such that the heat therefrom is transferred to a common surface, namely, the wall of the housing itself. The heat must now be picked up and channeled to the outside atmosphere with a minimum burden on the aircraft in terms of power consumed by the heat transfer process. As shown in Figs. 7 and 8, a rack, illustrated generally by reference numeral 79, is provided as a means for mounting a plurality of the modular assemblies 82. Each modular assembly is similar to that described hereinabove.

While the rack 79 is shown only partially in the drawings, an understanding of its structure will be readily apparent from the following description. One of the nodules has been removed to better illustrate certain portions of the rack construction. The rack includes a front panel 80 having a rabbet 81 along the peripheral edges thereof, said rabbet providing a shoulder 85 adjacent the inside edges thereof. A plurality of apertures 86 are furnished in the panel for receiving the individual modules.

The back 83 and the sides 84 of the rack are integral, said sides being mounted in the rabbet 81 adjacent the shoulder 85 and joined to the front panel 80 by appropriate means, i.e., soldering, welding, or the like. A plurality of apertures 87 are furnished in the back of the rack, each being of appropriate configuration for receiving the stud 63 and pin 66 of each module.

As best seen in Figs. 8 and 9, a fastener, illustrated generally by numeral 88, is mounted adjacent each of apertures 87 on the outside of back 83. The particular fastener shown is of conventional design and is illustrated in detail for ease in understanding only. The fastener includes a base strip which is apertured at each end to allow rivets 90 to be secured to the back 83. An upper strip 91 is formed integral with the base strip. The material from which the strips are formed is sufficiently resilient to allow relative movement between the strips. Apertures 92 are formed centrally of both strips of a configuration identical with that of apertures 87 in the back 83. A pair of similar rising surfaces 93, which may be referred to as cam follower surfaces, are provided on opposite sides of the aperture 93 in the upper strip. Detents 94 are furnished at the upper ends of said cam follower surfaces.

In mounting the modules, a rubber washer 95 is cemented to one end of the modules and a rubber grommet 96 is placed around the module adjacent the other end thereof and cemented thereto. Each module is shown to include a handle 97. To mount a module in the rack, it is inserted through the aperture 86 in panel 80 and pushed rearwardly. Stud 63 and pin 66 pass through aperture 87 in the back 83 and apertures 92 in the base and upper strips of fastener 88. Handle 97 is then grasped and the module is rotated in a direction to cause the ends of pin 66 to ride up the cam follower surfaces 93 and into detents 94. The resiliency of the upper strip 91 of the fastener holds the ends of the pin in the detents. Washer 95 is in abutment with the back 83 and provides an airtight seal between the inside of the rack and the outside atmosphere. Grommet 96 fits tightly in aperture 86 and serves a similar purpose.

In Fig. 4, the terminal plug 48 was shown attached to the module. The female connector for this plug is illustrated by reference numeral 98. A cable 99 is secured to the female connector and extends through a cylindrical member 100, which provides a passage between the front and back of the rack, to a terminal strip 101 mounted on the back of the rack. Here the individual wires of the cable may be connected to appropriate positions on the terminal strip.

After all modules have been placed in the rack, the entire rack may now be inserted in an appropriate forced air duct (not shown). The arrangement should be such that the forced air can pass through one of the sides 84 and out the side opposite to said one side. It will be noted that the air flow around the modules, as well as the cylindrical members 100 will be turbulent in nature. This affords maximum heat transfer from the module outer surface to the surrounding air.

From the above-detailed description it will be seen that an apparatus has been provided for housing electronic assemblies in a manner which affords efficient transmission of the heat generated by individual components of the assemblies to the outside atmosphere. This apparatus provides a favorable environment for the components independent of the altitude at which the assembly is operated. The design is such that the heat dissipative elements are as close to actual contact with the cooling medium as the requirement for hermetic sealing will allow. The path of heat conduction is from the electrical component to the mounting clip which is intimately connected to the wall of each module. Since the wall comes in direct contact with the cooling medium, maximum heat conduction is obtained. The attainment of a hermetic seal may be accomplished by the use of methods and machines which are well known in the canning industry. It will also be apparent that the apparatus utilizes materials efficiently in that steel is used where strength is required and copper where heat transfer and solderability are essential.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. An apparatus for housing airborne electronic circuit assemblies which include a plurality of heat dissipating electrical components and associated circuit means, a container having a perforated exterior wall and a solid inner wall, said walls being mounted adjacent each other, a plurality of clips mounted interiorally of said container on said inner wall, a printed circuit board having apertures therein for receiving said clips, said circuit board forming a part of said associated circuit means and arranged to lie adjacent said inner wall, said heat dissipating components being adapted to be fixedly mounted in said clips in intimate contact therewith and electrically connected to appropriate terminal points on said printed circuit board, terminal plug means in said container having electrical connections to appropriate terminals on said printed circuit board, the interior of said container being hermetically sealed to provide a favorable environment for assembly operation at all altitudes.

2. Apparatus for housing a plurality of circuit assemblies, each of said assemblies including heat dissipative electrical components and associated circuit means, a sealed container for housing each of said assemblies and including wall means, a plurality of clips mounted on the inner surface of said wall means for fixedly mounting a plurality of the heat dissipative components of the assembly therein to said wall means, a plurality of input and output leads for each container, terminal means for each container arranged to connect the input and output leads therefor to the circuit assembly within the container, a rack for receiving each container, means for securing each container to said rack, said rack being adapted to have a cooling medium passed therethrough, the heat dissipated from said components being transferred through said clips to the wall means of said container in which they are mounted and from said wall means to the cooling medium, and a plurality of tubular ways extending through said rack for causing turbulence in the cooling medium being passed through said rack.

References Cited in the file of this patent
UNITED STATES PATENTS

| | | |
|---|---|---|
| 2,470,037 | Liddle | May 10, 1949 |
| 2,593,479 | Nieter | Apr. 22, 1952 |
| 2,614,243 | Clark | Oct. 14, 1952 |
| 2,641,635 | Scal | June 9, 1953 |
| 2,653,181 | Millett | Sept. 22, 1953 |
| 2,668,933 | Shapiro | Feb. 9, 1954 |
| 2,703,853 | Chrystie | Mar. 8, 1955 |
| 2,787,735 | Scal | Apr. 2, 1957 |